United States Patent Office 3,488,321
Patented Jan. 6, 1970

3,488,321
PROCESS FOR LOWERING THE HYDROXYL GROUP CONTENT OF AN EPOXY RESIN BY TRANSESTERIFICATION
Eric Whichell Young, Saffron Walden, Bryan Dobinson, Duxford, Cambridge, and Bernard Peter Stark, Stapleford, Cambridge, England, assignors to Ciba Limited, Basel, Switzerland, a company of Switzerland
No Drawing. Filed Mar. 29, 1967, Ser. No. 626,678
Claims priority, application Great Britain, Apr. 21, 1966, 17,569/66
Int. Cl. C08g 30/04
U.S. Cl. 260—47    6 Claims

ABSTRACT OF THE DISCLOSURE

Process for reducing the hydroxyl group content of an epoxide resin which comprises reacting a hydroxyl group-containing epoxide resin with an ester of the formula

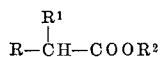

wherein $R^1$ denotes a hydrogen atom or an alkyl, alkenyl, aryl or aralkyl group; $R^2$ denotes an alkyl or alkenyl group containing not more than 6 carbon atoms; and R denotes a chlorine atom, or a group of the formula —$COOR^3$ where $R^3$ denotes an alkyl or alkenyl group containing not more than 6 carbon atoms, or a group of the formula —$COR^4$ where $R^4$ denotes an alkyl, alkenyl, aryl or aralkyl group.

---

This invention relates to processes for treating epoxide resins to reduce their hydroxyl group content, to hardenable compositions containing resins so treated, and to the products obtained by curing such compositions.

It is well-known that epoxide resins, i.e. compounds containing on average more than one 1,2-epoxide group per molecule, when prepared by conventional means, generally contain hydroxyl groups, sometimes necessarily formed by the process giving rise to the epoxide resin and sometimes unavoidably formed by partial reaction of the epoxy groups in the resin molecules. For example, the preparation of an epoxide resin by the reaction of a dihydric phenol of formula HO.Z.OH with epichlorohydrin in an alkaline medium may be represented as follows:

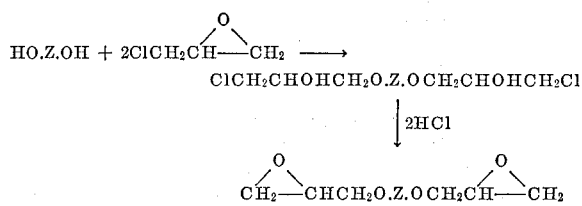

This diglycidyl ether may, however, react with a further molecule of the dihydric phenol thus:

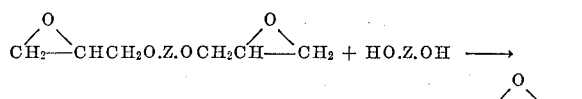

and the terminal phenolic group so produced may react with a further molecule of epichlorohydrin, and the product then undergo dehydrohalogenation as before. It will be seen that the final product may be represented by the average formula:

where $p$ may not be zero, but may be, for example, within the range of 0.5 to 2, in which case the product necessarily contains hydroxyl groups.

The hydroxyl content of commercially-available epoxide resins is often quite high. For example, the well-known epoxide resins prepared from Bisphenol A (2,2-bis(4-hydroxyphenyl)propane) and epichlorohydrin usually contain, if liquid at room temperature, from about 0.3 to 1 gram-equivalent of hydroxyl groups per kg., or, if melting at about 40 to 60° C., about 1.15 to 2.3 gram-equivalent per kg. Such resins may also contain chlorohydrin groups.

Epoxide resins are also produced by the reaction of acyclic or cyclic compounds containing two or more ethylenic bonds with an epoxidising agent, generally an organic percarboxylic acid. Such resins ordinarily contain a proportion of hydroxyl groups arising from practically unavoidable solvolysis of the epoxide groups.

While in many cases the presence of hydroxyl groups in an epoxide resin is acceptable or sometimes even desirable, it is sometimes preferable to employ an epoxide resin which is substantially free from hydroxyl groups. It has been found, for example, that the maximum temperature attained under the normal conditions of hardening by a mixture of a hydroxyl group containing epoxide resin which has been modified to render it substantially free from hydroxyl groups and an amine curing agent, is considerably less than that attained during the hardening under similar conditions of the unmodified resin, and less even than the maximum temperature attained during hardening under similar conditions of an unmodified hydroxyl group-containing resin of the same initial epoxide group content as the modified resin. Reduction in the maximum temperature attained is desirable so that the mixture undergoing cure should not attain a temperature so high that stresses occur within the cured product so severe as to cause formation of cracks and possible damage to components being encapsulated in the resin mixture. Further, compositions comprising epoxide resins which are substantially free from hydroxyl groups, and either a catalytic hardener or an unaccelerated polycarboxylic acid anhydride hardener, have longer pot-lives.

It has been proposed to prepare hydroxyl group-free epoxide resins by fractional distillation under reduced pressure of the crude resin. This process is, however, inconvenient and requires relatively expensive high-vacuum equipment. Further, when applied to the reaction product of Bisphenol A and epichlorohydrin, this process gives the substantially pure diglycidyl ether of Bisphenol A, which undesirably is liable to crystallise on standing at room temperature. The reaction between this purified resin and an amine curing agent is strongly exothermic, due to the high density of cross-linking.

It has now been found that the hydroxyl group content of epoxide resins may be substantially reduced by reaction of the hydroxyl groups with certain esters.

The present invention accordingly provides a process for reducing the hydroxyl group content of an epoxide resin which comprises treating a hydroxyl group-containing epoxide resin with an ester of the formula:

where $R^1$ denotes a hydrogen atom or an alkyl, alkenyl, aryl or aralkyl group; $R^2$ denotes an alkyl or alkenyl group containing not more than 6 carbon atoms; and R denotes a chlorine atom, or a group of the formula —$COOR^3$ where $R^3$ denotes an alkyl or alkenyl group containing not more than 6 carbon atoms, or a group of the formula —$COR^4$ where $R^4$ denotes an alkyl, alkenyl, aryl or aralkyl group.

Also within the scope of the present invention are hardenable compositions containing an epoxide resin treated according to the aforesaid new process and a curing agent therefor, and hardened compositions obtained from such compositions.

Preferred esters for use in the present invention are those of Formula I wherein R¹ denotes a hydrogen atom or an alkyl group containing not more than 3 carbon atoms, R is of the formula —COR⁴, and R⁴ denotes an alkyl or alkenyl group containing not more than four carbon atoms. Further preferred esters are those of Formula I wherein R¹ denotes a hydrogen atom, R² denotes an alkyl group containing not more than four carbon atoms, and R denotes a chlorine atom or a group of the formula —COR⁴ where R⁴ denotes an alkyl group containing not more than four carbon atoms.

Examples of esters of Formula I which may be used are methyl chloroacetate, n-propyl chloroacetate, n-butyl chloroacetate, dimethyl malonate, diethyl malonate, di-n-butyl malonate, dimethyl methylmalonate, diallyl malonate, dimethyl allylmalonate, methyl acetoacetate, n-propyl acetoacetate and ethyl 3-ketobutyrate, ethyl chloroacetate and ethyl acetoacetate being particularly preferred.

To effect reaction between the ester of Formula I and the hydroxyl group-containing epoxide resin, the two substances are heated together, and the alcohol (of formula R²OH) formed by transesterification is distilled off. Preferably, a large excess (calculated on the hydroxyl group content of the epoxide resin to be treated) of the ester of Formula I is employed. If desired, a solvent may be added to the reaction mixture, but such addition is not usually necessary. There may also be added to the reaction mixture a small amount of a catalyst for the transesterification reaction, especially a basic catalyst such as an alkoxide of an alkali metal or of an alkaline earth metal, e.g. sodium ethoxide, a quaternary ammonium hydroxide, e.g. benzyltrimethylammonium hydroxide, or ion-exchange resins containing quaternary ammonium hydroxide groups. If the ester of Formula I is an ester of chloroacetic acid or of a β-keto acid, the transesterification reaction usually proceeds satisfactorily in the absence of any added catalyst.

Conveniently an ester of Formula I which is more volatile than the epoxide resin to be treated is employed, so that any unreacted excess of the ester of Formula I may be distilled from the treated epoxide resin and then reused if desired.

Epoxide resins containing hydroxyl groups which may be treated by the new process include, for example, polyglycidyl esters obtainable by the reaction of a di- or polycarboxylic acid with epichlorohydrin or glycerol dichlorohydrin in the presence of an alkali. Such polyglycidyl esters may be derived from aliphatic dicarboxylic acids, e.g. oxalic acid, succinic acid, glutaric acid, adipic acid, pimelic acid, suberic acid, azelaic acid, sebacic acid, or dimerised or trimerised linoleic acd, and from aromatic dicarboxylic acids such as phthalic acid, isophthalic acid, terephthalic acid, naphthalene - 2,6-dicarboxylic acid, diphenyl - 2,2'-dicarboxylic acid and ethylene glycol bis(4-carboxyphenyl ether). Specific such polyglycidyl esters are, for example, diglycidyl adipate and those diglycidyl esters which correspond to the average formula:

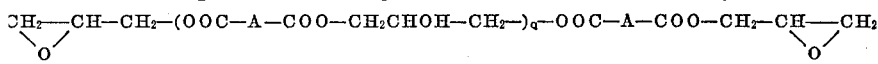

in which A represents a divalent aromatic hydrocarbon radical, such as a phenylene group, and $q$ represents a small positive whole or fractional number.

Further examples of epoxide resins which may be treated by the process of this invention are the polyglycidyl ethers obtainable by the interaction of a dihydric or polyhydric alcohol, or dihydric or polyhydric phenol, with epichlorohydrin or a related substance (for example, glycerol dichlorohydrin) under alkaline conditions or, alternatively, in the presence of an acidic catalyst with subsequent treatment with alkali. These compounds may be derived from diols or polyols, such as ethylene glycol, diethylene glycol, triethylene glycol, propane-1,2-diol, propane-1,3-diol, butane-1,4-diol, pentane - 1,5-diol, hexane-1,6-diol, hexane - 2,4,6-triol, glycerol or N-aryldialkanolamines such as N-phenyldiethanolamine, and are preferably derived from dihydric or polyhydric phenols such as resorcinol, catechol, hydroquinone, 1,4-dihydroxynaphthalene, 1,5 - dihydroxynaphthalene, bis(4-hydroxyphenyl)-methane, bis(4 - hydroxyphenyl)methylphenylmethane, bis(4-hydroxyphenyl) - tolylmethanes, 4,4'-dihydroxydiphenyl, bis(4-hydroxyphenyl)-sulphone, and, especially, 2,2-bis(4-hydroxyphenyl)-propane or phenol-formaldehyde condensation products.

Aminopolyepoxides may similarly be employed such as are, for example, obtained by the dehydrohalogenation of the reaction products of epihalohydrins and primary or disecondary amines such as aniline, n-butylamine, bis(4-aminophenyl)methane, or bis(4 - methylaminophenyl) methane, and epoxide resins obtained by the epoxidation of cyclic and acylic polyolefins, such as vinylcyclohexene dioxide, limonene dioxide, dicyclopentadiene dioxide, 3,4-epoxydihydrodicyclopentadienyl glycidyl ether, the bis (3,4 - epoxydihydrodicyclopentadienyl)ether of ethylene glycol, 3,4 - epoxycyclohexylmethyl 3',4'-epoxycyclohexanecarboxylate and its 6,6'-dimethyl derivative, the bis (3,4 - epoxycyclohexanecarboxylate) of ethylene glycol, the acetal formed between 3,4-epoxycyclohexanecarboxyaldehyde and 1,1-bis(hydroxymethyl) - 3,4-epoxycyclohexane, and epoxidised butadiene or copolymers or butadiene with ethylenic compounds such as styrene and vinyl acetate.

Examples of curing agents which may be used in the compositions of the invention include those conventionally employed as cross-linking agents for epoxide resins, for example, amines containing at least two hydrogen atoms directly attached to nitrogen, e.g. aliphatic and aromatic primary and secondary amines such as butylamine, p-phenylenediamine, bis(p-aminophenyl)methane, ethylenediamine, N,N'-diethyl-ethylenediamine, diethylenetriamine, N-hydroxyethyldiethylenetriamine, triethylenetetramine, tetraethylenepentamine, guanidine derivatives, such as phenylguanidine and diphenylguanidine, dicyandiamide, aniline-formaldehyde resins, polymers of aminostyrenes, and polyamino-amides, e.g. those prepared from aliphatic polyamines and dimerised or trimerised unsaturated fatty acids; isocyanates and isothiocyanates; polyhydric phenols, e.g. resorcinol, hydroquinone, 2,2-bis(4-hydroxyphenyl)propane, phenol-aldehyde resins and oil-modified phenol-aldehyde resins; reaction products of aluminum alkoxides or phenolates with tautomeric-reacting compounds of the acetoacetic ester type; Friedel-Crafts catalysts, e.g. AlCl₃, SnCl₄, ZnCl₂, BF₃, and their complexes with organic compounds; phosphoric acid; and polycarboxylic acids and their anhydrides, e.g. phthalic anhydride, methylendomethylenetetrahydrophthalic anhydride, dodecenylsuccinic anhydride, hexalydropthalic anhydride, hexachloroendomethylene-tetrahydrophthalic anhydride and endomethylenetetrahydrophthalic anhydride, and their mixtures, pyromellitic dianhydride, and maleic and succinic anhydrides.

Catalytic hardeners may also be used, e.g. tertiary amines such as 2,4,6-tris(dimethylaminomethyl)phenol, triethanolamine, and N-benzyldimethylamine; alkali metal alkoxides of alcohols such as 2,4-dihydroxy - 3-hydroxymethylpentane; stannous salts of alkanoic acids, such as stannous octoate; aluminum alkoxides; and triphenylphosphine.

The compositions of the present invention may also contain reactive diluents such as phenyl glycidyl ether. If desired, hydroxyl-group containing materials may be added to the modified resins in proportions such that there are obtained resins having reactivities intermediate between that of the unmodified resin and that of the modified resin substantially free from hydroxyl groups. They may also contain fillers, plasticisers, and colouring agents, for example, asphalt, bitumen, glass fibres, mica quartz powder, cellulose, kaolin, finely-divided silica (such as that available under the registered trademark "Aerosil"), or metal powder. The aforesaid compositions may be used as dipping, casting, potting, encapsulating, coating or adhesive resins.

The following examples illustrate the invention. Unless otherwise indicated, epoxide contents were determined by modification of the procedure described by Jay (Analytical Chemistry, 1964, 36, 667–8), the tetraethylammonium bromide being added as a solid instead of dissolved in glacial acetic acid, since the solution is not stable on storage.

Example I

The epoxide resin employed, hereinafter designated "Epoxide resin I" was prepared in a conventional manner by the reaction of Bisphenol A with epichlorohydrin in the presence of sodium hydroxide, and had the following characteristics: epoxide content, 5.30 equiv./kg.; chlorohydrin content, as determined by titration with methanolic sodium methoxide, 0.09 equiv./kg.; hydroxyl-group content, as estimated from the infra-red spectrum, 0.6 equiv./kg.; viscosity at 21° C., 238 poises.

A mixture of Epoxide resin I (200 g.) and ethyl acetoacetate (250 ml.) was heated to 100° C. for 30 minutes in a flask fitted with a Fenske fractionating column 31 cm. long, under a vacuum of about 100 mm. Ethanol produced during the reaction was condensed in a trap cooled with an acetone-solid carbon dioxide mixture. The mixture was then heated in a rotary evaporator under a vacuum of about 0.5 mm., the temperature being slowly raised to 100° C. and maintained at that level for 30 minutes.

The treated resin had an epoxide content of 4.99 equiv./kg.; its infra-red spectrum indicated that the hydroxyl-group content had been reduced to approximately 0.05 equiv./kg.

For purposes of comparison, a mixture of Epoxide resin I (50 g.) and ethyl cyanoacetate (100 ml.) was similarly heated to 125° C. for 3 hours. The mixture was stripped in vacuo as previously described. The infra-red spectrum of the residue indicated that a negligible decrease in hydroxyl-group content had occurred. The epoxide content had, however, decreased to 4.94 equiv./kg. A further portion of Epoxide resin I (50 g.) was heated with ethyl cyanoacetate (100 ml.) in the presence of 1 ml. of methanolic 4 N-sodium methoxide as catalyst at 100° C. under a vacuum of 14 mm. Carbon dioxide was then passed into the cooled mixture to neutralise the catalyst, and the filtered mixture was held at 100° C. under a vacuum of about 0.7 mm. for 30 minutes. Again, the infra-red spectrum of the residue indicated that a negligible decrease in hydroxyl-group content had occurred. The epoxide content, however, decreased to 4.5 equiv./kg.

To epoxy resin I (100 g.) and ethyl butyrate (200 ml.) was added 1 ml. of concentrated hydrochloric acid as catalyst, and the mixture was heated in a flask fitted with a Fenske fractionating column 31 cm. long and a partial-return still head. The temperature of the liquid refluxing at the top of the column rose rapidly to above 100° C., and a proportion of the refluxing liquid was removed slowly when the temperature at the top of the column fell below 120° C. After the mixture had been heated for 20 hours, it was stripped under vacuum. No significant decrease in hydroxyl-group content could be detected from the infra-red spectrum.

In a further experiment, Epoxide resin I (50 g.) was heated with 6 g. of triethyl phosphonoacetate

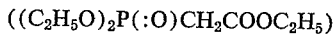

$$((C_2H_5O)_2P(:O)CH_2COOC_2H_5)$$

for 1 hour at 120° C. As no ethanol was evolved, 1 ml. of methanolic 4 N-sodium methoxide was added as catalyst, and the mixture was heated for another hour at 120° C. Carbon dioxide was passed into the cooled mixture, and the mixture, after filtration, was stripped under a vacuum of 0.7 mm. at 100° C. The infra-red spectrum of the residue showed that no significant decrease in hydroxyl-group content had occurred. The epoxide content, however, decreased to 4.23 equiv./kg.

Example II

A mixture of Epoxide resin I (50 g.) and ethyl chloroacetate (75 ml.) was heated at atmospheric pressure for 5 hours in a flask fitted with a Fenske fractionating column having a partial return fractionation head. During this period a fraction of the refluxing liquid was slowly removed, and the temperature of the refluxing liquid at the top of the fractionating column rose slowly from 120° C. to 143° C. Volatile materials were then removed from the residue by heating at 100° C. under a vacuum of 0.5 mm.

The infra-red spectrum of the residual product showed the hydroxyl-group content to have been substantially reduced.

Example III

A mixture of Epoxide resin I (100 g.), diethyl malonate (86 ml.) and approximately 4 N-methanolic sodium methoxide solution (2 ml.) was heated in a flask fitted with a reflux condenser under a vacuum of 14 mm. to a temperature such that the diethyl malonate refluxed slowly. Ethanol liberated was condensed in a trap cooled with an acetone-solid carbon dioxide mixture. After two hours, the mixture was allowed to cool, and carbon dioxide gas was then passed into the mixture to neutralise residual catalyst. The mixture was filtered, and then freed from volatile materials by heating for 30 minutes at 100° C. under a pressure of 0.5 mm.

The infra-red spectrum of the residual product indicated that the hydroxyl-group content had been reduced.

Example IV

In this example, an epoxide resin was employed, hereinafter designated "Epoxide resin II," which was similar to Epoxide I except that it had an epoxide content of 5.20 equiv./kg. and a viscosity at 21° C. of 235 poises. A modified resin was prepared from Epoxide resin II as described in Example I; it had a viscosity at 21° C. of 298 poises and a Gardner colour value of 4–5.

For purposes of comparison there was also used a carefully-purified fraction of a polyglycidyl ether of Bisphenol A, hereinafter designated "Epoxide resin III." It had an epoxide content, as determined by titration with hydrogen bromide in glacial acetic acid, of 5.78 equiv./kg. (the calculated content for Bisphenol A diglycidyl ether is 5.88 equiv./kg.); the chlorohydrin content, as determined by titration with methanolic sodium methoxide, was 0.03 equiv./kg., while the hydroxyl group content, as estimated from the infra-red spectrum, was less than 0.05 equiv./kg. At room temperature, it consisted of moist crystals.

Three mixtures were prepared comprising, respectively, 100 parts of the modified Epoxide resin II with 26 parts of 4,4'-diaminodiphenylmethane, 100 parts of the unmodified Epoxide resin II with 27 parts of 4,4'-diaminodiphenylmethane, and 100 parts of the unmodified Epoxide resin III with 30 parts of 4,4'-diaminodiphenylmethane (the higher proportions of curing agent corresponding to the higher epoxide contents of the unmodified resins). The temperature of 100 g. samples of the mixtures, heated to 70° C. and placed in vacuum-jacketed flasks, rose to respective maxima of 214° C. (after 70 minutes), 224° C. (after 40 minutes), and 230° C. (after 65 minutes). Samples of these mixtures, after curing for 3 hours at 80° C. plus 4½ hours at 140° C. had respective deflection temperatures under load (measured according to ASTM Specification D648–56) of 142° C., 156° C. and 154° C.

What is claimed is:
1. A process for lowering the hydroxyl group content of an epoxy resin containing on average more than one 1,2-epoxide group per molecule which comprises reacting at a transesterification temperature such a secondary hy- droxyl group-containing epoxy resin with an ester of the formula

wherein $R^1$ is a member selected from the group consisting of hydrogen atom, alkyl, alkenyl, aryl and aralkyl group; $R^2$ is a member selected from the group consisting of alkyl group containing not more than 6 carbon atoms and alkenyl group containing not more than 6 carbon atoms; and R is a member selected from the group consisting of chlorine atom, a group of the formula —$COOR^3$ where $R^3$ is a member selected from the group consisting of alkyl group containing not more than 6 carbon atoms and alkenyl group containing not more than 6 carbon atoms, and a group of the formula —$COR^4$ where $R^4$ is a member selected from the group consisting of alkyl, alkenyl, aryl and aralkyl group.

2. A process as claimed in claim 1, wherein the ester of Formula I is ethyl acetoacetate.

3. A process as claimed in claim 1, wherein the ester of Formula I is ethyl chloroacetate.

4. A process as claimed in claim 1, wherein the reaction is carried out in the presence of a small amount of a basic catalyst.

5. A process as claimed in claim 4, wherein the basic catalyst is a member selected from the group consisting of an alkoxide of an alkali metal, an alkoxide of an alkaline earth metal, a quaternary ammonium hydroxide, and an ion-exchange resin containing quaternary ammonium hydroxide groups.

6. A process as claimed in claim 1, wherein the ester of Formula I used is more volatile than the epoxy resin and is employed in amount in excess of that required to react with all the hydoxyl groups of the epoxy resin, and the excess of the said ester of Formula I is distilled from the treated epoxy resin after the completion of the reaction.

References Cited

UNITED STATES PATENTS 3,301,920   1/1967   Price.

WILLIAM H. SHORT, Primary Examiner

T. PERTILLA, Assistant Examiner

U.S. Cl. X.R.

260—2